United States Patent
Vandewall et al.

(10) Patent No.: US 9,637,236 B2
(45) Date of Patent: May 2, 2017

(54) LARDER SYSTEMS HAVING INTERLOCKING LARDER CASES

(71) Applicant: The Boeing Company, Chicago, IL (US)

(72) Inventors: Cynthia A. Vandewall, Snohomish, WA (US); Ming Kwan Esmond Tan, Singapore (SG); Kai Shen Elston Cheah, Singapore (SG); Hisham Tarek Bary, Singapore (SG)

(73) Assignee: The Boeing Company, Chicago, IL (US)

(*) Notice: Subject to any disclaimer, the term of this patent is extended or adjusted under 35 U.S.C. 154(b) by 233 days.

(21) Appl. No.: 14/637,025

(22) Filed: Mar. 3, 2015

(65) Prior Publication Data

US 2016/0257407 A1    Sep. 8, 2016

(51) Int. Cl.
*B64D 11/04* (2006.01)
*A47B 46/00* (2006.01)
*A47B 47/00* (2006.01)
*A47B 69/00* (2006.01)
*A47B 87/02* (2006.01)

(52) U.S. Cl.
CPC .......... *B64D 11/04* (2013.01); *A47B 46/00* (2013.01); *A47B 47/0091* (2013.01); *A47B 69/00* (2013.01); *A47B 87/02* (2013.01)

(58) Field of Classification Search
CPC ..... B64D 11/04; A47B 46/00; A47B 47/0091; A47B 87/02; A47B 69/00
See application file for complete search history.

(56) References Cited

U.S. PATENT DOCUMENTS

| | | | | |
|---|---|---|---|---|
| 2,569,236 | A * | 9/1951 | Hake | A47B 87/02 312/111 |
| 2,988,411 | A * | 6/1961 | Vannice | A47B 87/02 312/111 |
| 4,436,355 | A * | 3/1984 | Fortune | A47B 88/0407 312/111 |
| 4,592,601 | A * | 6/1986 | Hlinsky | A47B 87/02 206/504 |
| 5,799,792 | A | 9/1998 | Abrums | |
| 6,089,373 | A | 7/2000 | Cope | |
| 6,250,490 | B1 | 6/2001 | Loftus | |
| 6,585,090 | B2 | 7/2003 | Harvey | |

(Continued)

*Primary Examiner* — Valentina Xavier
(74) *Attorney, Agent, or Firm* — Kwan & Olynick LLP

(57) ABSTRACT

Provided are larders systems, aircraft equipped with such systems, and methods of operating such systems. A larder system includes at least two larder cases removably disposed in the same compartment of a larder enclosure. The two cases are detachably interlocked with each other such that removal of the outer case from the enclosure advances the inner case closer to the opening. After the removal of the outer case, the inner case may be retained at the opening. The two cases may be interlocked when pushed against each other, such as when the outer case is inserted into the compartment containing the inner case. In some embodiments, a larder case may be interlocked with the larder enclosure or one of its components, such as a door. This enclosure interlocking allows for the larder case to retain its interlocked position when, for example, the enclosure is only partially filed.

20 Claims, 8 Drawing Sheets

(56) References Cited

U.S. PATENT DOCUMENTS

| | | | |
|---|---|---|---|
| 6,619,768 B1* | 9/2003 | Northrop | A45F 3/46 |
| | | | 312/290 |
| 6,857,535 B1 | 2/2005 | Zuckerman | |
| 7,014,058 B2 | 3/2006 | Gledhill | |
| 7,748,554 B2 | 7/2010 | Murphy | |
| 8,087,527 B2 | 1/2012 | Johnson | |
| 8,393,485 B2 | 3/2013 | Gold | |
| 8,573,428 B2 | 11/2013 | Furuta | |
| 8,684,222 B2 | 4/2014 | Tesink et al. | |
| 2004/0188564 A1* | 9/2004 | Boe | B64D 9/00 |
| | | | 244/118.1 |
| 2013/0134842 A1* | 5/2013 | Kassanoff | A47B 47/0091 |
| | | | 312/7.2 |
| 2016/0235195 A1* | 8/2016 | Ahart | A47B 47/0091 |

* cited by examiner

LARDER SYSTEMS HAVING INTERLOCKING LARDER CASES

TECHNICAL FIELD

This disclosure generally relates to larder systems used in galleys of aircraft and other types of vehicles. More specifically, this disclosure relates to larder systems, each having two or more detachably interlocked larder cases, which are removably disposed in the same compartment of a larder enclosure.

BACKGROUND

Aircraft and other types of vehicles, such as ships, trains, recreational vehicles (RVs), typically include service galleys for preparing meals and refreshments for passengers and crew. For example, a passenger aircraft may include one or more service galleys in a fuselage, such two service galleys positioned at each end of a fuselage. These service galleys or, simply, galleys may be used to store food, equipment, and other items used during operation of the aircraft. Various types of storage systems or, more specifically, larder systems are used for these purposes. Due to the space constraints and the need to store many different items, conventional larder systems use deep larder enclosures and long larder cases extending into these enclosures. However, accessing and handling these long larder cases can be quite difficult. For example, an aircraft may have narrow space available around its service galley, which restricts removal and handling of these long larder cases. Furthermore, once a larder case is removed, the galley may not have adequate space to put this case on, for example, to review content of this larder case and access various items stored in the case. Finally, long larder cases may be very heavy when filled with certain items (e.g., beverages) and/or may be positioned at locations that are difficult to reach (e.g., overhead compartments or floor level compartments). Stacking multiple smaller cases into the same compartment solves some of these problems but, at the same time, presents various other challenges, such as reaching and retrieving inner larder cases from deep compartments. Furthermore, when a deep multi-case compartment is only partially filled with small larder cases, the remaining cases may be unsupported in the compartment and may bounce back and forth between front and back walls of the compartment. This lack of support is particularly undesirable for larder systems used in moving vehicles, such as aircraft, which are subjected to shaking, vibrations, and other motions during their operation.

SUMMARY

Provided are larders systems, aircraft equipped with such systems, and methods of operating such systems. A larder system includes at least two larder cases removably disposed in the same compartment of a larder enclosure. The two cases are detachably interlocked with each other such that removal of the outer case from the enclosure advances the inner case closer to the opening. After the removal of the outer case, the inner case may be retained at the opening. The two cases may be interlocked when pushed against each other, such as when the outer case is inserted into the compartment containing the inner case. In some embodiments, a larder case may be interlocked with the larder enclosure or one of its components, such as a door. This enclosure interlocking allows for the larder case to retain its interlocked position when, for example, the enclosure is only partially filled.

In some embodiments, a larder system for an aircraft includes a larder enclosure, first larder case, and second larder case. The larder enclosure may also include a first bottom support, back wall, and front wall. The first larder case may be disposed within the larder enclosure and slidably supported on the first bottom support of the larder enclosure. In some embodiments, the first bottom support includes a linear bearing to provide the slidable support to the first larder case and other larder cases positioned in the same compartment.

The first larder case has a first side and second side. The first side faces the back wall of the larder enclosure. The first larder case may also include a first pad for sliding on the first bottom support. The first pad may be used in addition or instead of the linear bearing of the first bottom support described above. The first larder case has a first latch positioned at the first side and a second latch positioned at the second side.

The second larder case is also disposed within the larder enclosure and slidably supported on the first bottom support of the larder enclosure. The second larder case is disposed between the first larder case and the back wall. The second larder case also has a first side and second side. The first side of the second larder case faces the back wall of the larder enclosure. The second side of the second larder case faces the first side of the first larder case. The second larder case may include a second pad for sliding on the first bottom support. The second larder case includes a first latch positioned at the first side of the second larder case and a second latch positioned at the second side of the second larder case. Overall, the second larder case and first larder case may be substantially the same and may be interchangeable.

When the second larder case and first larder case are positioned inside the larder enclosure on the same first bottom support, the first latch of the first larder case may be detachably interlocked with the second latch of the second larder case. In this case, sliding the first larder case on the first bottom support in the direction away from the back wall causes sliding of the second larder case in the same direction. In other words, when the first larder case is interlocked with the second larder case, pulling the first larder case out of the larder enclosure causes the second larder case to advance away from the back wall and, for example, into the previous location of the first larder case, such as near the opening of the larder enclosure.

When the first larder case is removed from the larder enclosure, the first latch of the first larder case is unlocked from the second latch of the second larder case. Furthermore, when the first larder case is removed from the larder enclosure, the second larder case may be locked in the place previously occupied by the first larder case leaving empty space between the second larder case and the back wall of the larder enclosure.

In some embodiments, at least one of the first latch of the first larder case or the second latch of the second larder case is movable between its interlocked position and unlocked position. The interlocked positioned may be also referred to as a latched positioned, while the unlocked positioned may be also referred to as an unlatched position. Specifically, in the interlocked position, the first latch of the first larder case is detachably interlocked with the second latch of the second larder case. As noted above, in this position, sliding the first larder case in the direction away from the back wall causes sliding of the second larder case in the same direction. On the other hand, in the unlocked position, the first latch of the first larder case is not interlocked with the second latch. In this position, sliding the first larder case in the direction away from the back wall does not cause sliding of the second larder case in the same direction. Instead, in this later case, the second larder case may remain stationary when the first larder case slides in the direction away from the back wall. In some embodiments, when the first larder case and the second larder case are both disposed in the same compartment, the two cases or, more specifically, their respective latches may remain interlocked.

In some embodiments, the second latch of the second larder case is movable (e.g., relative to the second side 204b of the second larder case), while the first latch of the first larder case may be stationary. Alternatively, the first latch of the first larder case is movable (e.g., relative to the first side 203a of the first larder case), while the second latch of the second larder case may be stationary.

The second latch of the second larder case may be substantially the same as the second latch of the first larder case. Likewise, the first latch of the second larder case may be substantially the same as the first latch of the first larder case. As noted above, the first larder case and second larder case may be substantially the same and may be interchangeable.

In some embodiments, one of the first latch of the first larder case or the second latch of the second larder case is pivotable between the interlocked position and the unlocked position. For example, the second latch of the second larder case may be pivotable, while the first latch of the first larder case may be stationary. Alternatively, the first latch of the first larder case may be pivotable, while the second latch of the second larder case may be stationary.

In some embodiments, one of the first latch of the first larder case or the second latch of the second larder case includes a spring. The spring may be used to maintain the first latch of the first larder case detachably interlocked with the second latch of the second larder case, for example, when no external forces are applied to either one of the two latches (such as a user unlocking the latches). In some embodiments, the spring automatically interlocks the first latch of the first larder case with the second latch of the second larder case when the first larder case and second larder case are pushed against each other during loading of the larder enclosure, e.g., when the first larder case is pushed against the second larder case.

In some embodiments, the larder enclosure includes an enclosure latch detachably interlocked with the second latch, the first latch, or some other components of the first larder case. For example, the enclosure latch may detachably interlock the second side of the first larder case. This interlocking feature prevents the first larder case from sliding on the first bottom support, e.g., when the second larder case is not present and a space exists between the first larder case and the back wall of the larder enclosure. Specifically, the enclosure latch may prevent the first larder case from sliding on the first bottom support toward the back wall of the larder enclosure. In the same or another example, the enclosure latch may prevent the first larder case from sliding on the first bottom support away from the back wall of the larder enclosure. Specifically, the enclosure latch may prevent the first larder case from accidentally going through the opening of the larder enclosure when the enclosure latch is engaged.

The enclosure latch may be disposed at the front wall of the larder enclosure, such as near the opening. It should be noted that when the first larder case is removed from the larder enclosure, the enclosure latch may detachably interlock with the second latch or some other component (e.g., the second side) of the second larder case thereby preventing the second larder case from sliding on the first bottom support. In this later case, the second larder case may be positioned away from the back wall of the larder enclosure such that there is an empty space between the back wall of the larder enclosure and the second larder case sufficient to fit another larder case. Specifically, the enclosure latch may prevent the second larder case from sliding on the bottom support toward the back wall of the larder enclosure. In the same or another example, the enclosure latch may prevent the second larder case from sliding on the first bottom support away from the back wall of the larder enclosure.

In some embodiments, the first larder case includes a bumper pad disposed on the first side of the first larder case. The bumper pad may contact the second side of the second larder case when the first latch of the first larder case is detachably interlocked with the second latch of the second larder case. The bumper pad of the first larder case may be compressible. Specifically, the bumper pad of the first larder case may be compressed when the first latch of the first larder case is detachably interlocked with the second latch of the second larder case. In some embodiments, the second larder case may include a bumper pad disposed on the first side of the second larder case and contacting the back wall of the larder enclosure.

In some embodiments, the first latch of the first larder case is formed by a top edge of the first side of the first larder case. Specifically, the second latch of the second larder case may interlock this top edge. For example, the second latch of the second larder case may include a slot which receives the top edge during the interlocking process. Likewise, the first latch of the second larder case may be formed by a top edge of the first side of the second larder case.

In some embodiments, the larder enclosure includes a door pivotably attached to the front wall of the larder enclosure. The second latch of the first larder case may contact the door when the first larder case is positioned within the larder enclosure when the door is closed. In this case, the door may prevent the first larder case from sliding on the first bottom support in the direction away from the back wall. In some embodiments, the second side of the first larder case may contact the door when the first larder case is positioned within the larder enclosure when the door is closed. The second latch of the first larder case may not be used to contact the door. Instead, a direct contact between the second side of the first larder case and the door is formed. In some embodiments, the door may include an enclosure latch, which is detachably interlocked with the second latch or some other component of the first larder case when the door is closed. In this case, the enclosure latch prevents the first larder case from sliding on the first bottom support in the direction away toward the back wall. The enclosure latch of the door may pull the first larder case from the larder enclosure as the door opens.

In some embodiments, the larder system also includes a third larder case disposed within the larder enclosure and slidably supported on a second bottom support of the larder enclosure. The first bottom support is disposed between the first larder case and the third larder case. The third larder case may be identical to the first larder case and to the second larder case. In fact, any larder case of the larder system may be interchangeable with another other larder case.

Also provided is an aircraft including a fuselage and a larder system disposed within the fuselage. Various examples of suitable larder systems are described above. In some embodiments, the larder system includes a larder enclosure, first larder case, and second larder case. The larder enclosure may have a first bottom support, back wall, and front wall. The first larder case may be disposed within the larder enclosure and may be slidably supported on the first bottom support of the larder enclosure. The first larder case has a first side and second side. The first side of the first larder case faces the back wall of the larder enclosure. The first larder case includes a first latch positioned at the first side of the first larder case and a second latch positioned at the second side of the first larder case.

The second larder case is also disposed within the larder enclosure and slidably supported on the first bottom support of the larder enclosure between the first larder case and the back wall. The second larder case has a first side and second side. The first side of the second larder case faces the back wall of the larder enclosure. The second side of the second larder case faces the first side of the first larder case. Furthermore, the second larder case may include a first latch positioned at the first side and a second latch positioned at the second side. The first latch of the first larder case may be detachably interlocked with the second latch of the second larder case such that sliding the first larder case on the first bottom support in a direction away from the back wall causes sliding of the second larder case on the first bottom support in the direction away from the back wall.

Also provided is a method for operating a larder system on an aircraft. The method may involve inserting an inner larder case into a larder enclosure. The inner larder case includes a first side and second side. The first side of the inner larder case faces a back wall of the larder enclosure. The inner larder case includes a first latch positioned at the first side of the inner larder case and a second latch positioned at its second side.

The method may proceed with inserting an outer larder case into the larder enclosure. In various examples of larder systems described above, the first larder case represents the outer larder case, while the second case represents the inner larder case. Specifically, the inner larder case is disposed between the outer larder case and the back wall of the larder enclosure. The outer larder case also has a first side and second side. The first side of the outer larder case faces the back wall of the larder enclosure. The second side of the inner larder case faces the first side of the outer larder case. The outer larder case includes a first latch positioned at its first side and a second latch positioned at its second side. The first latch of the outer larder case is detachably interlocked with the second latch of the inner larder case as the outer larder case is inserted into the larder enclosure. When the first latch of the outer larder case is interlocked with the second latch of the inner larder case, sliding the outer larder case on the first bottom support in a direction away from the back wall causes sliding of the inner larder case on the first bottom support in the direction away from the back wall.

BRIEF DESCRIPTION OF THE DRAWINGS

Figure 1:
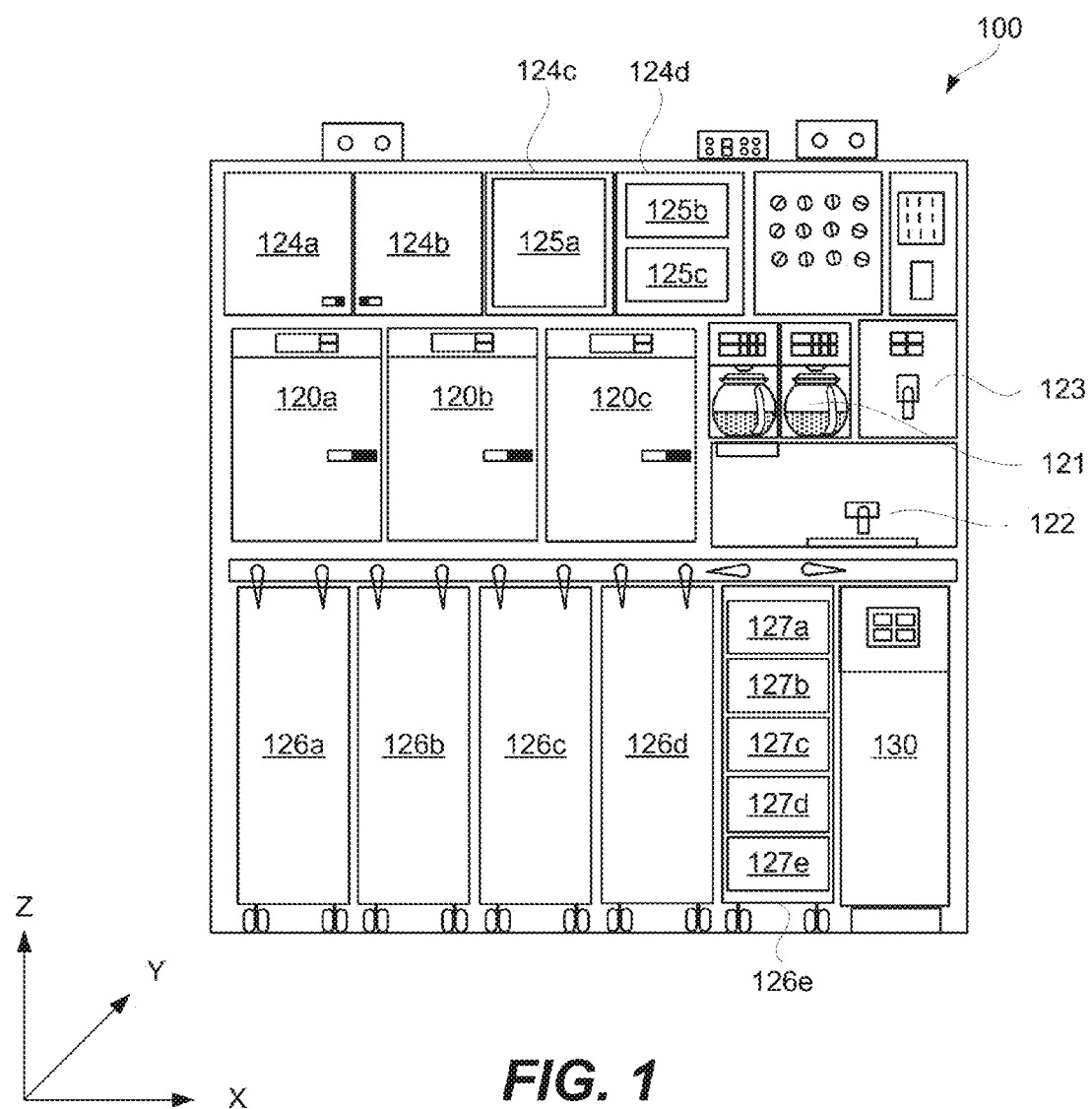

Having thus described examples of the disclosure in general terms, reference will now be made to the accompanying drawings, which are not necessarily drawn to scale, and wherein like reference characters designate the same or similar parts throughout the several views, and wherein:

FIG. 1 is a schematic front view of a galley having multiple larder systems, in accordance with some embodiments.

Figure 2:
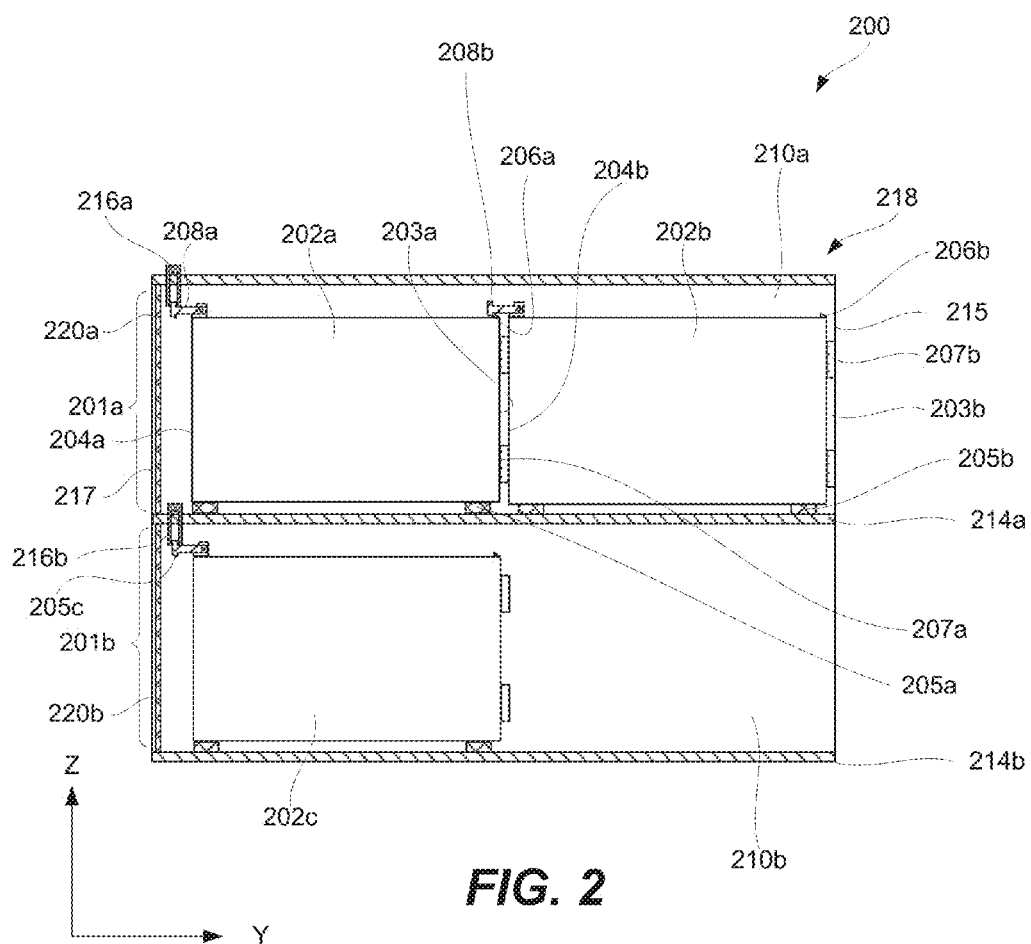

FIG. 2 is a schematic cross-sectional view of a larder system having two compartments, each compartment capable of accommodating multiple larder cases, in accordance with some embodiments.

Figure 3A:
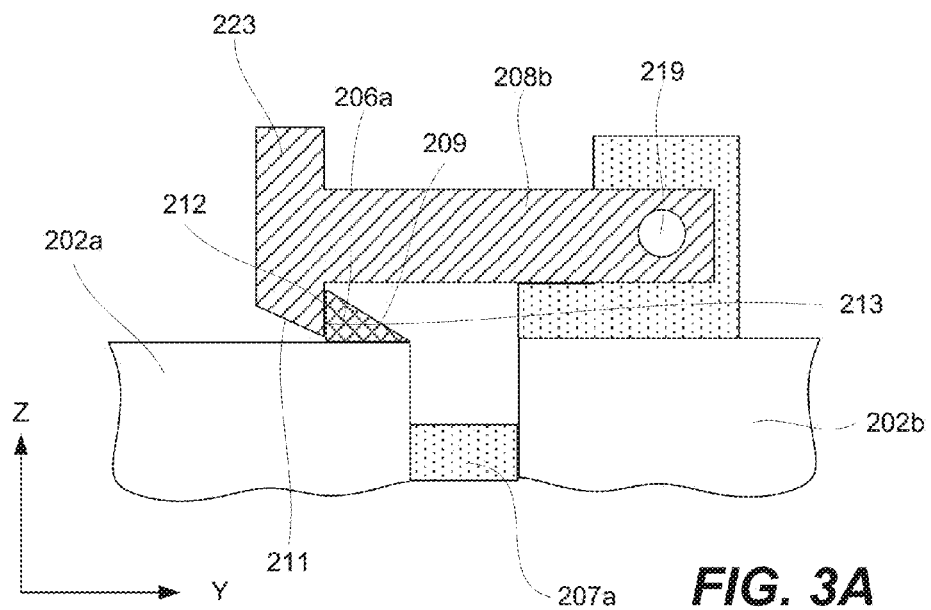

FIG. 3A is a schematic illustration of two interlocked larder case latches, in accordance with some embodiments.

Figure 3B:
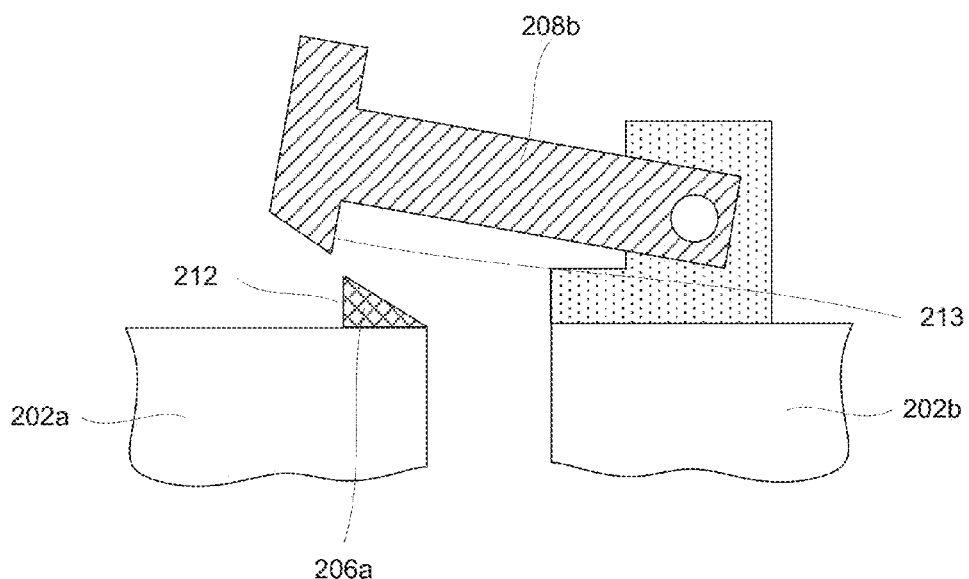

FIG. 3B is a schematic illustration of two larder case latches that are not interlocked, in accordance with some embodiments.

Figure 3C:
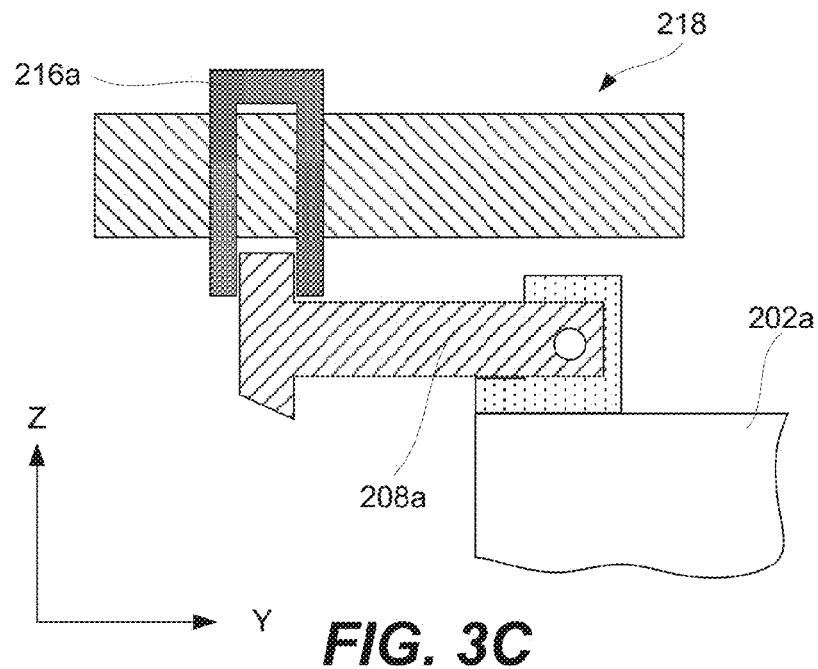

FIG. 3C is a schematic illustration of a larder case latch interlocked with an enclosure latch, in accordance with some embodiments.

Figure 3D:
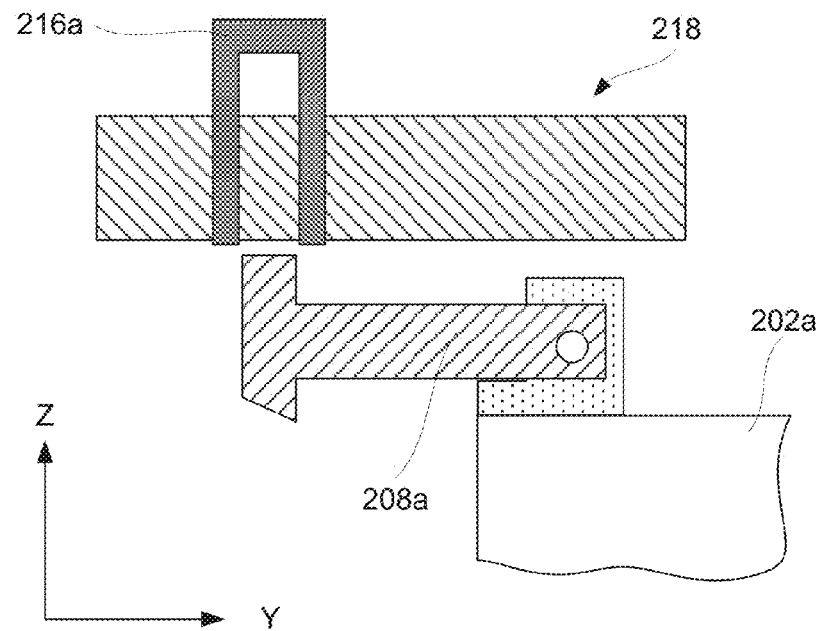

FIG. 3D is a schematic illustration of a larder case latch that is not interlocked with an enclosure latch, in accordance with some embodiments.

Figure 3E:
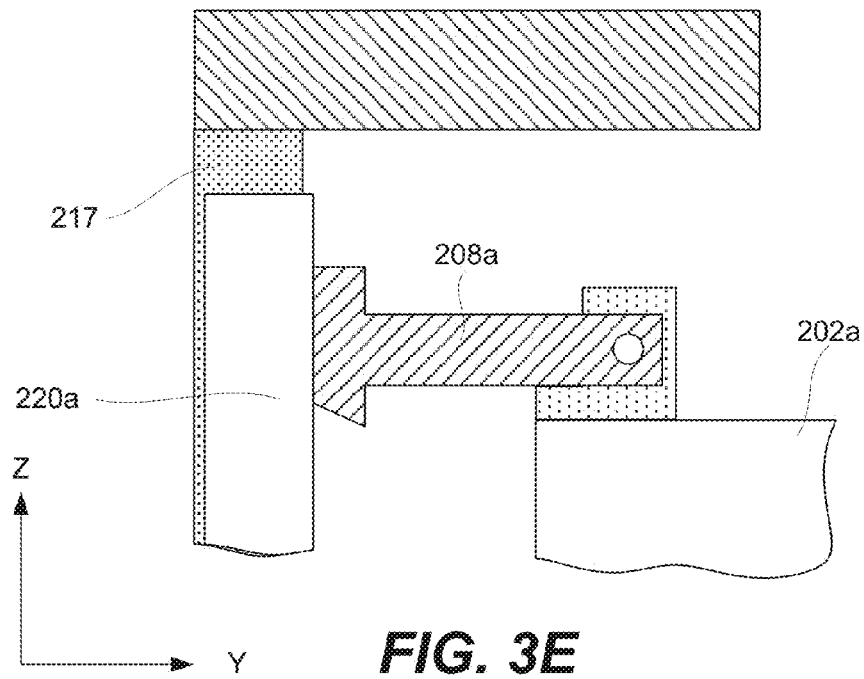

FIG. 3E is a schematic illustration of a larder case latch contacting the door or a larder enclosure, in accordance with some embodiments.

Figure 3F:
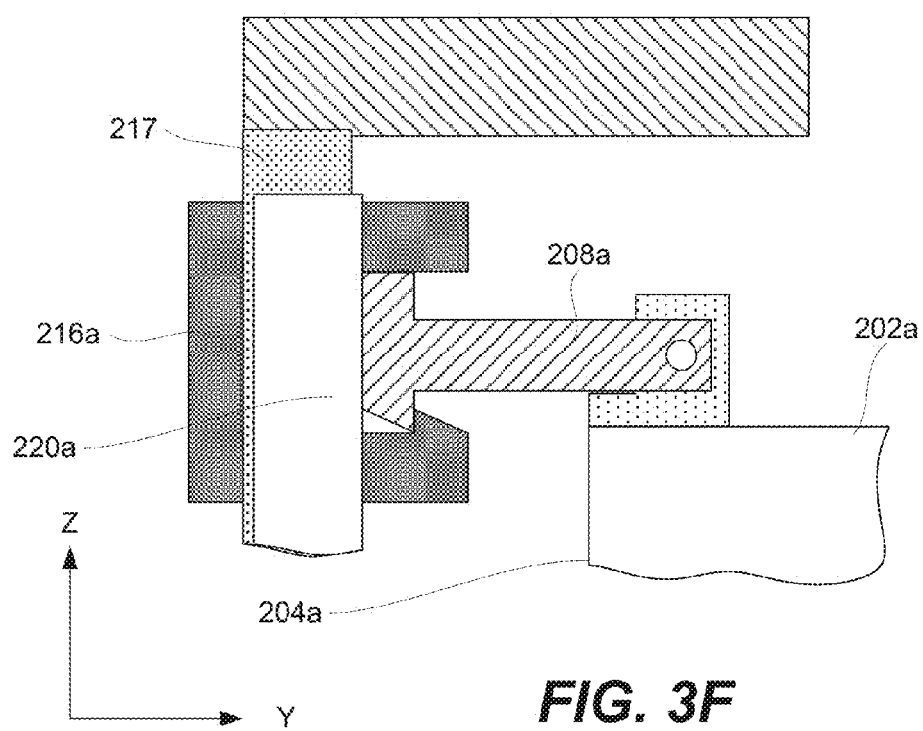

FIG. 3F is a schematic illustration of a larder case latch interlocked with an enclosure latch positioned on the door of a larder enclosure, in accordance with some embodiments.

Figure 4:
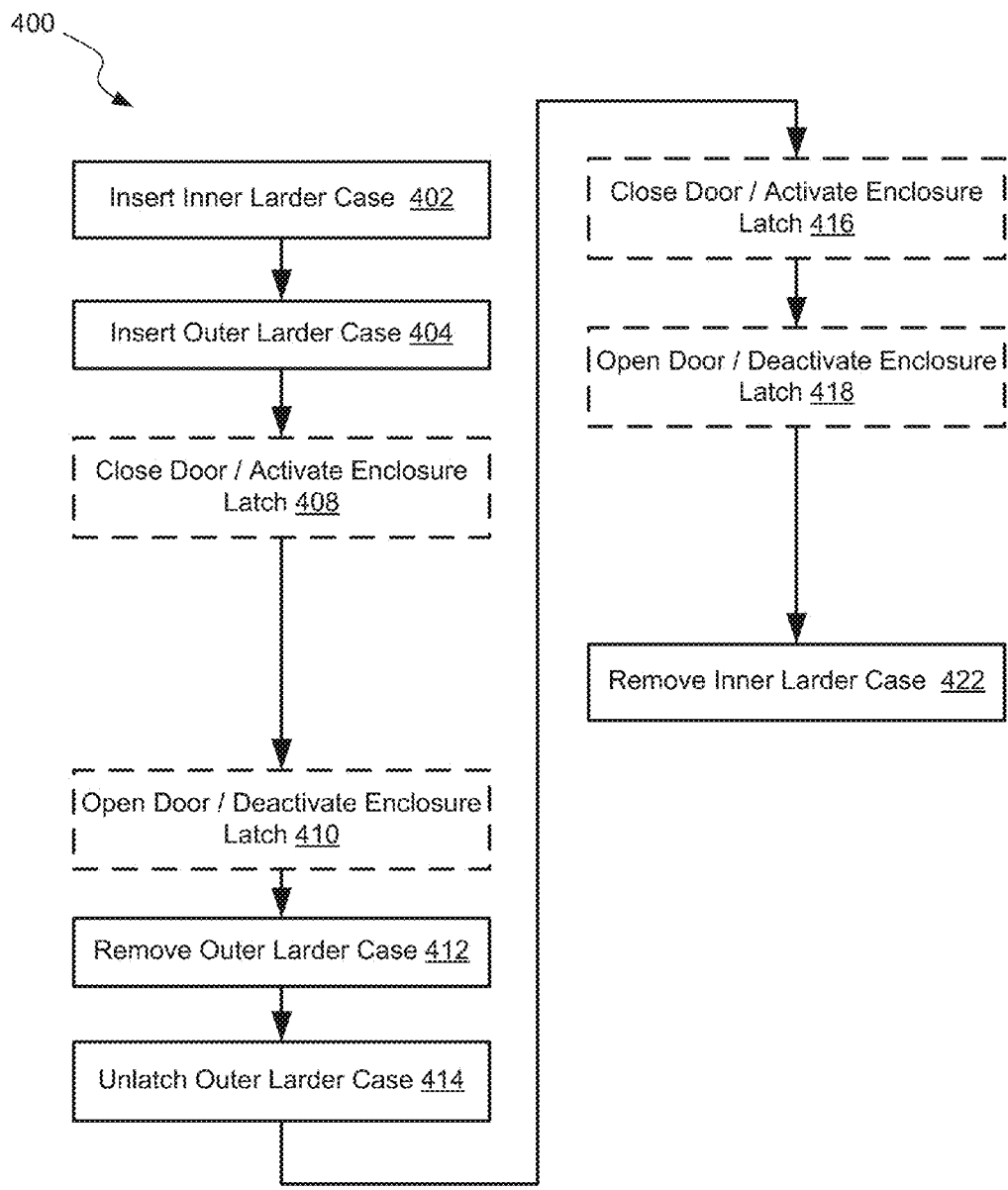

FIG. 4 is a method of operating a larder system having a compartment capable of accommodating multiple larder cases, in accordance with some embodiments.

Figure 5:
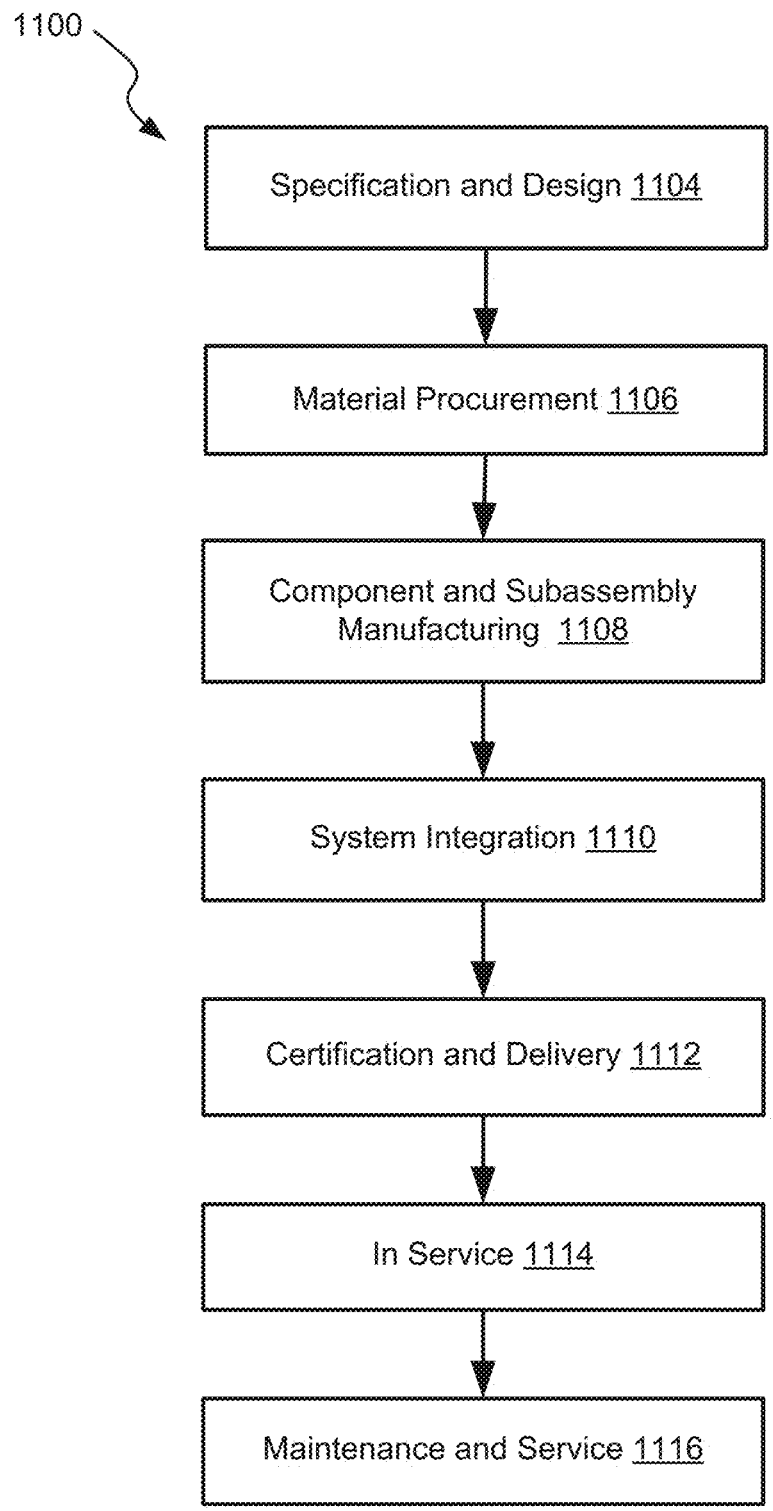

FIG. 5 is a block diagram of an aircraft production and service methodology that may utilize one or more assemblies.

Figure 6:
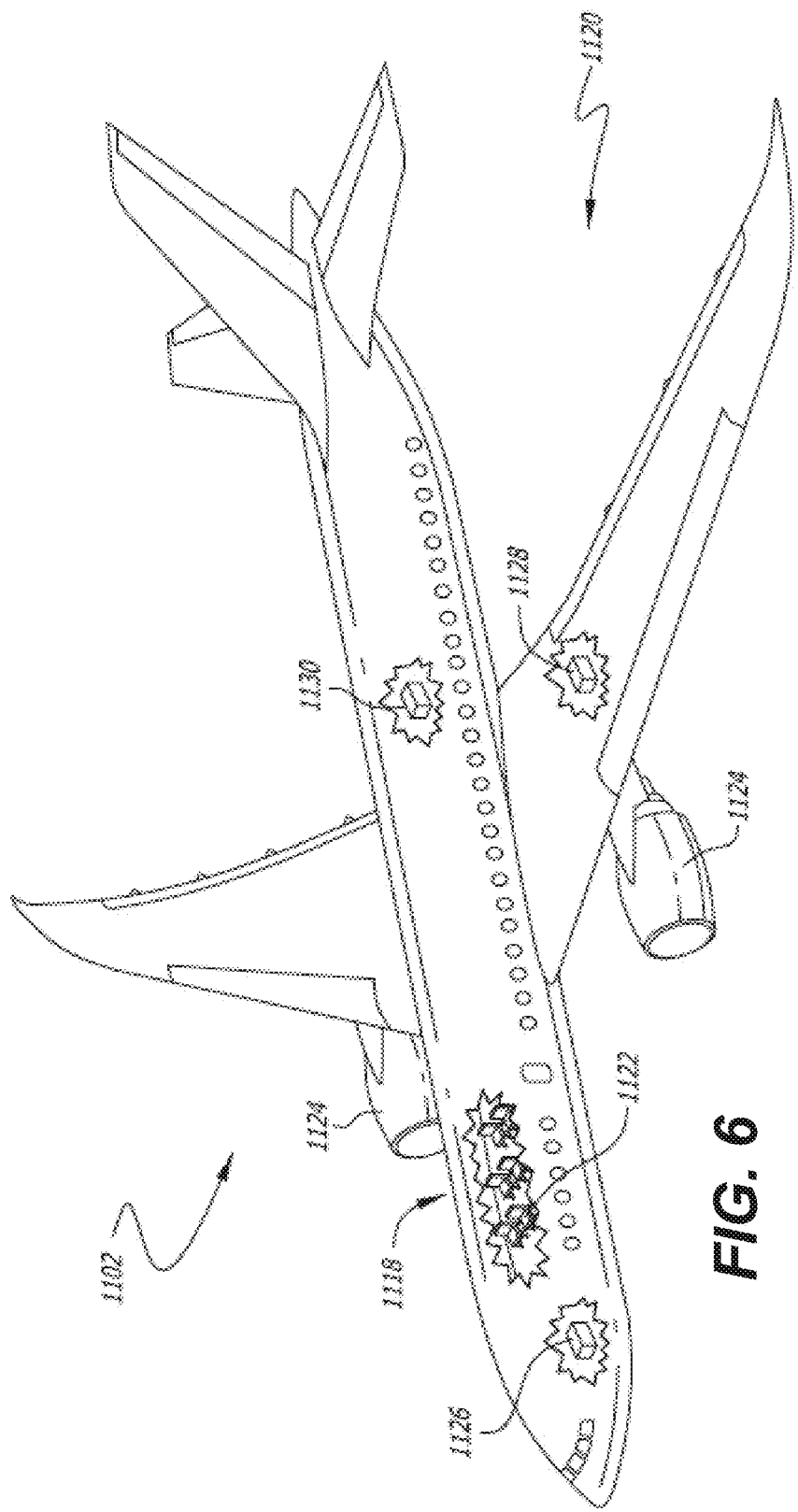

FIG. 6 is a schematic illustration of an aircraft that may utilize one or more larder systems.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Introduction

Many conventional larder systems have deep larder enclosures and use long larder cases to achieve more efficient utilization of available space. For example, an aircraft typically has a round fuselage with a floor level being at roughly the widest portion of the fuselage and tapering down towards the ceiling. A larder system positioned against a curved wall of this fuselage may have shorter larder cases in overhead larder enclosures and longer larder cases in bottom larder enclosures. Accessing and handling these long larder cases can be difficult especially when these cases positioned at low levels (e.g., near the floor). Likewise, accessing large cases may be difficult at the high levels. Galleys are also often positioned in tight spaces, such as near exits, lavatories, and other like objects. The space limitation restricts removal and handling of long larder cases. Often, very little or even no space is available in a galley to position a long case for its loading and unloaded after the case is removed from its compartment. Furthermore, long larder cases tend to be quite heavy when filled with various items. Finally, using different length larder cases (e.g., shorter cases for overhead enclosures and longer cases for lower enclosures) provides better space utilization but, at the same time, makes handling these different cases difficult. For example, a longer case may not be used in a compartment designed for a shorter case. At the same time, while a shorter case may fit into a compartment designed for a longer case, the shorter case may unrestrictedly bounce within this compartment unless a specific retention mechanism is used as further described below.

Stacking multiple larder cases into the same compartment addresses some of the problems listed above. However, this stacking presents various other challenges. One particular challenge is reaching and retrieving inner larder cases from a deep compartment when outer cases have been removed. For example, when two larder cases are inserted into the same compartment and the outer larder case is removed, a user needs to reach deep into the compartment (e.g., at least the length of the outer larder case) in order to reach the inner larder case and bring it the opening of this compartment. This operation may be particular difficult for compartments positioned at high and low levels. Furthermore, if a compartment is only partially filled, the one or more remaining larder cases in the compartment may bounce between front and back walls of the larder enclosure. In other words, a partially filled compartment has some additional space (previously occupied by other cases) that allows the remaining cases to move, unless these remaining cases are restricted. This free movement in partially filled compartments may be highly undesirable in moving vehicles, such as aircraft.

For purposes of this disclosure, the stacking refers to a horizontal stacking of two or more larder cases in the same compartment. These cases are typically supported using the same bottom support. This type of stacking may be referred to as a depth wise stacking to differentiate from a vertical stacking when one larder case may be positioned in one compartment disposed over another compartment that contains another larder case, or when one larder case may be positioned on another larder case in the same compartment.

Provided are larders systems in which larder cases are interlocked with each other when inserted into the same compartment. This interlocking feature allows advancing an inner larder case closer to the opening of the compartment when the outer larder case is being removed. The described larder systems reduce the need for users to stretch uncomfortably in order to reach deep into the compartment when attempting to remove the inner larder case. Furthermore, in some embodiments, one or more of these larder cases may be interlocked with a larder enclosure or its components, such as a door. As such, one of the larder cases is removed from the compartment and the compartment is partially filled, the remaining one or more cases are not free to move within the compartment.

Each larder case may have a first latch positioned on one of its side and a second latch positioned on the opposite side, e.g., one side facing the back wall of the larder enclosure and the other side facing the opening of the larder enclosure. Specifically, when two larder cases (e.g., a first larder case and second larder case) are inserted into the same compartment, the first latch of the first larder case interlocks the second latch of the second larder case. One of these latches may have a hinge allowing this latch to pivot during the interlocking process as well as during the corresponding unlocking process. Specifically, when one larder case is forced against another larder case (e.g., while inserting larder cases in the same compartment), the first latch of the first larder case may be pressed against and eventually interlocks with the second latch of the second larder case. The force with which the latches are forced against each other may cause the hinged latch to pivot and slide over the other latch until engaged. As such, the interlocking may occur without any additional involvement from a user. In some embodiments, the bottom of the larder cases may include multiple pointed surfaces to reduce the contact surface and, as a result, the friction between the bottom support of the compartment and the bottom of the larder case. In the same or other embodiments, the bottom support or the larder case includes a linear bearing to facilitate the linear movement of the larder case on the bottom support between front and back walls of the larder enclosure. In the same or other embodiments, the bottom support of the compartment may be fabricated from a reduced friction material.

In order to provide better understanding of larder systems and their operating environments, a brief description of a galley is provided. Specifically, FIG. 1 is a schematic front view of galley 100 having multiple larder systems, in accordance with some embodiments. Specifically, galley 100 includes overhead storage cabinets 124a-124d and carts 126-126e. Each of storage cabinets 124a-124d and carts 126-126e may be a separate larder system. The boundary of a larder system may be defined by its larder enclosure such that each larder system may have a separate larder enclosure. Furthermore, each larder system may include one or more compartments. At least one of these compartments is capable of receiving two larder cases. Other components of galley 100 may include ovens 218a-218c, coffee makers 121, sink 122, hot water supply 124, and garbage compactor 130, which are presented for context and may not be larder systems.

Each of overhead storage cabinets 124a-124d and carts 126-126e or, more specifically, each larder system may include one or more compartments such that at least one compartment may fit multiple cases along the depth of the compartment (in the Y direction as shown in FIG. 1). In some embodiments, all compartments may fit multiple cases along their depths. When a larder system has multiple compartments, all compartments may have the same capacity or different compartments. For example, one compartment may fit two cases along its depth while another compartment may fit only one case along its depth. It should be noted that different compartments of the same larder system and even different larder systems may use standard larder cases, i.e., substantially the same or identical larder cases. The standardization of larder cases significantly simplifies the process of handling the cases allowing interchangeable use of the cases. For example, cases filled with items may be positioned in one compartment. Once cases are emptied by a user, the empty cases may be moved into a different compartment. As such, the cases may be interchangeable.

As noted above, different larder systems may have different depths and accommodate different number of larder cases along their depths. For example, carts 126a-126e may be deeper than overhead storage cabinets 124a-124d. The back wall of galley 100 may follow the fuselage profile which may be wider at the level of carts 126a-126e and narrower at the level of overhead storage cabinets 124a-124d. As such, carts 126a-126e may fit more standard cases (having the same length/depth) than overhead storage cabinets 124a-124d along their depth (the Y direction).

Furthermore, the compartments of different larder systems may have the same size opening measured in the X and Z directions. For example, overhead storage cabinet 124d (shown with an open door) has two compartments 125b and 125c, each having the same width (in the X dimension) and height (in the Z dimension) as compartments 127a-127e of cart 126e (also show with an open door). As such, larder cases used in compartments 125b and 125c may be also used in compartments 127a-127e. The compartments of different larder systems may also have different size openings measured in the X and Z directions. For example, the opening of compartment 125a of overhead storage cabinet 124c is larger than the openings of compartments 125b and 125c of overhead storage cabinet 124d. In this case, larder cases from compartments 125b and 125c may still be used in compartment 125a but not the other way around.

Larder System Examples

FIG. 2 is a schematic cross-sectional view of larder system 200 capable of accommodating two or more larder cases in at least one compartment, in accordance with some embodiments. Larder system 200 may be positioned in a fuselage of an aircraft or may be used in other types of vehicles. Larder system 200 may include larder enclosure 218 that defines the boundary of larder system 200. Larder enclosure 218 may have one or more compartment, such as two compartments 210a and 210b as illustrated in FIG. 2. It should be noted that larder enclosure 218 may have any number of compartments. At least one of these compartments 210a and 210b may accommodate two or more larder cases stacked along the depth of the compartment (the Y direction). Specifically, FIG. 2 illustrates first larder case 202a and second larder case 202b disposed within first compartment 210a. Second compartment 210b is shown with only one larder case, i.e., third larder case 202c. However, as illustrated, second compartment 210b has a sufficient space for an additional larder case to be disposed between third larder case 202c and back wall 215 of larder enclosure 218. In some embodiments, different compartments in the same enclosure may different depths and different case-capacities as noted above with reference to FIG. 1.

Larder enclosure 218 includes first bottom support 214a and provides a slidable support to first larder case 202a and second larder case 202b. First bottom support 214a may extend the entire depth (the Y direction) of first compartment 214a, e.g., between back wall 215 and front wall 217, as shown in FIG. 2. First bottom support 214a may include one or more rails. For example, one rail may be disposed along one side of larder enclosure 218 and another rail may be disposed along the other size of larder enclosure 218, each providing support to respective bottom edges of first larder case 202a and second larder case 202b. In some embodiments, first bottom support 214a includes a linear bearing. Each compartment may have a separate support. As shown in FIG. 2, first bottom support 214a is used to support cases inserted into first compartment 210a, while second bottom support 214b is used to support cases inserted into second compartment 210b.

In some embodiments, first larder case 202a may include first pad 205a for sliding on first bottom support 214a. Likewise, second larder case 202b may include second pad 205b for sliding on first bottom support 214a. Pads 205a and 205b may be made from a low friction material, such as polyethylene terephthalate (PTFE). In some embodiments, pads 205a and 205b may include multiple pointed surfaces to reduce the contact surface and, as a result, the friction between pads 205a and 205b and first bottom support 214a.

In an example illustrated in FIG. 2, first larder case 202a is an outer case, while second larder case 202b is an inner case. Both first larder case 202a and second larder case 202b are positioned in the same compartment, e.g., first compartment 210a in the example illustrated in FIG. 2. In other words, second larder case 202b is inserted into first compartment 210a before first larder case 202a. One having ordinary skills in the art would understand that the relative position of first larder case 202a and second larder case 202b in first compartment 210a may be reversed.

Returning to the example illustrated in FIG. 2, first larder case 202a has first side 203a and second side 204a. First side 203a faces back wall 215 of larder enclosure 218. Second side 204a faces opening 201a of first compartment 210a. First larder case 202a also has first latch 206a positioned at first side 203a and second latch 208a positioned at second side 204a. In some embodiments, a top edge of first side 203a or second side 204a may be operable as a latch and no additional mechanisms may be provided.

Second larder case 202b is disposed within larder enclosure 218 and is slidably supported on first bottom support 214a of larder enclosure 218 between first larder case 202a and back wall 215. Second larder case 202b also has first side 203b and second side 204b. First side 203b of second larder case 202b faces back wall 215 of larder enclosure 218. Second side 204b of second larder case 202b faces first side 203a of first larder case 202a. Second larder case 202b also includes first latch 206b positioned at first side 203b of second larder case 202b and second latch 208b positioned at second side 204b of second larder case 202b. Overall, second larder case 202b and first larder case 202a may be substantially the same and may be interchangeable.

When second larder case 202b and first larder case 202a are positioned inside larder enclosure 218 on the same support, first latch 206a of first larder case 202a may be detachably interlocked with second latch 208b of second larder case 202b. When interlocked, sliding first larder case 202a on first bottom support 214a in the direction away from back wall 215 (in the direction opposite of the Y axis as shown in FIG. 2) causes sliding of second larder case 202b on first bottom support 214a in the same direction. In other words, when first larder case 202a and second larder case 202b are interlocked, pulling first larder case 202a out of larder enclosure 218 causes second larder case 202b to advance away from back wall 215 and eventually into the previous location of first larder case 202a. When first larder case 202a is removed from larder enclosure 218, second larder case 202b may be positioned in the previous position of first larder case 202a leaving empty space between second larder case 202b and back wall 215.

It should be noted that while first latch 206a of first larder case 202a may be detachably interlocked with second latch 208b of second larder case 202b, other latches of these cases may be interlocked to other components or not used. As shown in FIG. 2 and further described below with reference to FIGS. 3C and 3D, second latch 208a of first larder case 202a may be detachably interlocked with enclosure latch 216a. In the same example, first latch 206b of second larder case 202b is not used. When the order of the larder cases in first compartment is reversed in the compartment, i.e., first larder case 202a becomes an inner case and second larder case 202b becomes an outer case, then second latch 208a of first larder case 202a may be detachably interlocked with first latch 206b of second larder case 202b.

FIG. 3A is a schematic expanded view of two interlocked larder case latches 206a and 208b shown in FIG. 2, in accordance with some embodiments. Specifically, first latch 206a of first larder case 202a is detachably interlocked with second latch 208b of second larder case 202b. It should be noted that first larder case 202a and second larder case 202b may have a gap in between their respective sides when their latches are interlocked. Bumper pad 207a may be disposed in this gap as further described below and may force the larder cases apart when they are interlocked thereby applying a force to the interlocked connection. This force may be used to maintain the interlocked connection. When interlocked, first latch 206a of first larder case 202a cannot move away from second latch 208b of second larder case 202b in the direction along the Y axis as shown in FIG. 3A. As such, when first larder case 202a is pulled away from second larder case 202b in the direction along the Y axis (e.g., when first larder case 202a is being removed from larder enclosure 218), first larder case 202a pulls second larder case 202b in the same direction.

The interlocking process depends on the design of larder case latches 206a and 208b. For example, as shown in FIG. 3A, larder case latches 206a and 208b may have sliding surfaces 209 and 211, respectively. Sliding surfaces 209 and 211 may be tilted, or angled, with respect to the direction of the larder case movement within the compartment. When first latch 206a advances toward second case latch 208b, e.g., when first larder case 202a is pushed toward second larder case 202b, sliding surface 211 of second larder case 202a slides over sliding surface 209 of first larder case 202a. The respective angles of sliding surfaces 209 and 211 may cause second latch 208b to rise relative to first latch 206a as two latches 206a and 208b advances toward each other and while sliding surfaces 209 and 211 remain in contact. In some embodiments, second latch 208b may have hinge 219 that allows second latch 208b to pivot relative to second larder case 202b when interlocking with first latch 206a. When sliding surface 211 of second latch 208b passes sliding surface 209 of first latch 206a, second latch 208a may drop toward first latch 206a. This drop may be caused, for example, by a spring disposed within hinge 219, weight of second latch 208a, or some other means. Once the drop occurs, first latch 206a is interlocked with second latch 208b and cannot be moved away with respect to each other in the Y direction. Specifically, engagement surface 212 of first latch 206a presses against engagement surface 213 of second latch 208b as, e.g., shown in FIG. 3A, preventing first latch 206a and second latch 208b to move away with respect to each other in the Y direction.

In order to disengage first latch 206a from second latch 208b, second latch 208b needs to be lifted with respect to first latch 206a such that engagement surface 212 of first latch 206a is clear with respect to engagement surface 213 of second latch 208b as, e.g., shown in FIG. 3B. Specifically, FIG. 3B is a schematic illustration of two larder case latches 206a and 208b that are not interlocked, in accordance with some embodiments. In this position, first latch 206a and second latch 208b (and corresponding cases) can move away with respect to each other in the Y direction.

In some embodiments, at least one of first latch 206a of first larder case 202a or second latch 208b of second larder case 202b is movable between its interlocked position and unlocked position. More specifically, at least one of first latch 206a of first larder case 202a or second latch 208b of second larder case 202b is pivotable between interlocked position and unlocked position. An example of the interlocked position is illustrated in FIG. 3A, while an example of the unlocked position is illustrated in FIG. 3B. In this example, second latch 208b of second larder case 202b is movable (e.g., pivotable), while first latch 206a of first larder case 202a is stationary. However, one having ordinary skills in the art would understand that other designs can be used as well. For example, second latch 208b of second larder case 202b may remain stationary (and may not include a hinge), while first latch 206a of first larder case 202a may be configured to depress into the top surface of first larder case 202a such that engagement surface 212 of first latch 206a becomes clear with respect to engagement surface 213 of second latch 208b.

Second latch 208b of second larder case 202b may be substantially the same as second latch 208a of first larder case 202a. Likewise, first latch 206b of second larder case 202b may be substantially the same as first latch 206a of first larder case 202a. In fact, both larder cases 202a and 202b may have substantially the same design and may be interchangeable in the examples shown in FIG. 2. Specifically, first larder case 202a may be disposed between second larder case 202b and back wall 215, i.e., first larder case 202a may be an inner case while second larder case 202b may be an outer case. In this example, second latch 208a of first larder case 202a may interlock with first latch 206b of second larder case 202b.

In some embodiments, at least one of first latch 206a of first larder case 202a or second latch 208b of second larder case 202b includes a spring. The spring may be used to maintain first latch 206a of first larder case 202a detachably interlocked with second latch 208b of second larder case 202b. For example, the weight of second latch 208b alone may not be sufficient to maintain this interlocking connection in vibrating or otherwise dynamic environments. In some embodiments, spring automatically interlocks first latch 206a of first larder case 202a with second latch 208b of second larder case 202b when first larder case 202a and second larder case 202b are pushed against each other during loading of larder enclosure 218. In the example shown in FIGS. 3A and 3B, the spring may be a part of second latch 208b of second larder case 202b, which is a movable latch or, more specifically, a pivotable latch. First latch 206a of first larder case 202a may be stationary. The spring may force interlocking portion 223 of second latch 208b toward first latch 206a. In some embodiments, the spring is a part of hinge 219.

In some embodiments, first latch 206a of first larder case 202a is formed by a top edge of first side 203a of first larder case 202a. Specifically, second latch 208b of second larder case 202b may interlock with this top edge. For example, second latch 208b of second larder case 202b may include a slot which receives top edge during interlocking process.

In some embodiments, one or both larder cases may be interlocked with larder enclosure 218. FIG. 3C is a schematic illustration of second latch 208a of first case 202a interlocked with enclosure latch 216a, in accordance with some embodiments. For example, enclosure latch 216a may protrude through the top surface of larder enclosure 218 and may engage second latch 208a or first case 202a as shown in FIG. 3C. In this case, first case 202a is not movable with respect to larder enclosure 218 in the Y direction. It should be noted that first case 202a may be also interlocked with another case as, for example, shown in FIG. 2. This other case may not be movable with respect to larder enclosure 218 in the Y direction because of it being interlocked with first case 202a, which, in turn, is interlocked with larder enclosure 218. Alternatively, first case 202a may be the only case in this compartment and no other larder cases may be interlocked with first case 202a. This later example is further described below with reference to FIG. 2 and third case 202c positioned in second compartment 210b.

FIG. 3D is a schematic illustration of second latch 208a of first case 202a not being interlocked with enclosure latch 216a, in accordance with some embodiments. For example, enclosure latch 216a may be advanced away (e.g., pulled up) from second latch 208a of first case 202a, which causes enclosure latch 216a being disengaged from second latch 208a of first case 202a. In some embodiments, second latch 208a of first case 202a may remain stationary while engaging or disengaging from enclosure latch 216a. Alternatively, enclosure latch 216a may remain stationary while engaging or disengaging from second latch 208a of first case 202a, while second latch 208a may be moved away from enclosure latch 216a, or alternatively, both latches may move while engaging or disengaging. Enclosure latch 216a may be positioned at front wall 217 for accessibility by a user and ease of operation.

Overall, larder enclosure 218 may include enclosure latch 216a detachably interlocked with second latch 208a of first larder case 202a thereby preventing first larder case 202a from sliding on first bottom support 214a. Likewise, enclosure latch 216a may be interlocked with second latch 208b of second larder case 202b when, for example, first larder case 202a is removed from first compartment 210a. This interlocking between enclosure latch 216a and second latch 208b of second larder case 202b prevents second larder case 202b from sliding on first bottom support 214a. While the examples below refer to enclosure latch 216a being detachably interlocked with second latch 208a of first larder case 202a, one having ordinary skills in the art would understand that enclosure latch 216a may be interlocked with any other component of first larder case 202a. For example enclosure latch 216a may be interlocked with second side 204a of first larder case 202a rather than second latch 208a. Furthermore, enclosure latch 216a may be interlocked with first latch 206b of second larder case 202b.

In some embodiments, larder enclosure 218 has door 220a for covering one or more openings 201a and 201b in front wall 217. For example, a separate door may be used for each of first compartment 210a and second compartment 210b. Specifically, FIG. 2 illustrates door 220a used for compartment 210a and door 220b used for second compartment 210b. Alternatively, the same door may be used for both first compartment 210a and second compartment 210b. The door may be used to retain larder cases within their respective compartments and to prevent these larder cases from sliding through openings 201a and 201b when the door is closed. In some embodiments, the door may come in contact with the outer side of the outermost case (e.g., second side 204a of first case 202a in FIG. 2) when the door is closed. This may occur when the compartment is filled to its capacity with larder cases (e.g., both first larder case 202a and second larder cases 202b are disposed in first compartment 210a) or when a compartment is only partially filled (e.g., third larder case 202c is disposed in second compartment 210b). Alternatively, a larder case latch may come in contact with the door when the door is closed and the compartment is filled to its capacity with larder cases.

FIG. 3E is a schematic illustration of second latch 208a of first case 202a contacting door 220a, in accordance with some embodiments. Door 220a may be pivotably attached to front wall 217 of larder enclosure 218. Second latch 208a of first larder case 202a may contact door 220a when first larder case 202a is positioned within larder enclosure 218 and when door 220a is closed. In this case, door 220a may prevent first larder case 202a from sliding on first bottom support 214a in a direction away from back wall 215 (i.e., in the direction opposite of the Y direction as shown in FIG. 3E). However, it should be noted that in this case, first larder case 202a may be free to slide in the direction toward back wall 215 (i.e., in the Y direction as shown in FIG. 3E). When present in the same compartment and the compartment is completely full, second larder case 202b may prevent first larder case 202a from sliding in this direction if second larder case 202b is present between first larder case 202a and back wall 215. However, often a compartment may be partially filled and additional case retention mechanisms may be used.

As shown in FIG. 3F, door 220a may include enclosure latch 221 detachably interlocking with second latch 208a of first larder case 202a when door 220a is closed and when first larder case 202a is adjacent to door 220a. Enclosure latch 221 prevents first larder case 202a from sliding on first bottom support 214a in the direction toward back wall 215 (i.e., in the Y direction as shown in FIG. 3F). Enclosure latch 221 of door 220a may also pull first larder case 202a from larder enclosure 218 as door 220a opens. In other words, at least second side 204a of first case 202a may advance through opening 201a in front wall 217 while door 220a is being opened. It should be noted that door 220a and/or enclosure latch 221 also prevents first larder case 202a from sliding on first bottom support 214a in direction away from back wall 215 (i.e., in the direction opposite of the Y direction as shown in FIG. 3E).

Returning to FIG. 2, in some embodiments, first larder case 202a includes a bumper pad 207a disposed on first side 203a of first larder case 202a. Bumper pad 207a may contact second side 204b of second larder case 202a when first latch 206a of first larder case 202a is detachably interlocked with second latch 208b of second larder case 202b. Bumper pad 207a of first larder case 202a may be compressible. Specifically, bumper pad 207a of first larder case 202a may be compressed when first latch 206a of first larder case 202a is detachably interlocked with second latch 208b of second larder case 202b. In some embodiments, second larder case 202b may include a bumper pad 207b disposed on first side 203b of second larder case 202b and contacting back wall 215 of larder enclosure 218.

In some embodiments, larder system 200 also includes a third larder case 202c disposed within larder enclosure 218 and slidably supported on a second bottom support 214b of larder enclosure 218. First bottom support 214a is disposed between first larder case 202a and third larder case 202c. In some embodiments, first and second sides are interchangeable, in other words larders can go in with either side facing the back side of the larder enclosure.

Examples of Operating Larder Systems

FIG. 4 is a process flowchart corresponding to method 400 of operating a larder system capable of accommodating multiple larder cases in the same compartment, in accordance with some embodiments. Method 400 may commence with inserting an inner larder case into a larder enclosure during operation 402. Various examples of larder cases and larder enclosures are described above with reference to FIGS. 2 and 3A-3F. Specifically, the inner larder case has a first side and a second side such that the first side of the inner larder case faces a back wall of the larder enclosure after operation 402. The inner larder case includes a first latch positioned at the first side of the inner larder case and a second latch positioned at the second side of the inner larder case.

After operation 402, the compartment, which received the inner case, may still have space for one or more larder cases. As such, method 400 may proceed with inserting an outer larder case into the same compartment during operation 404. After operation 404, the inner larder case is disposed between the outer larder case and the back wall of the larder enclosure. Similar to the inner case, the outer larder case has a first side and second side. The first side of the outer larder case faces the back wall of the larder enclosure and the second side of the inner larder case. The outer larder case includes a first latch positioned at the first side and a second latch positioned at the second side. The first latch of the outer larder case is detachably interlocked with the second latch of the inner larder case as the outer larder case is inserted into the larder enclosure during operation 404. Various aspects of this interlocking process are described above with reference to FIGS. 3A and 3B. When interlocked, sliding the outer larder case on the first bottom support in a direction away from the back wall causes sliding of the inner larder case in the same direction.

In some embodiments, one or more additional larder cases may be disposed between the back wall of the larder enclosure and the inner larder case and/or between the outer larder case and the opening of the larder enclosure. In other words, one or more additional larder cases may be inserted into the same compartment prior to operation 402 and/or after operation 404. Any two adjacent larder cases in the same larder enclosure are interlocked within each pair. Any intermediate larder case, i.e., a larder case disposed between two other larder cases in the same compartment, is interlocked with both adjacent larder cases. For purposes of further description, the outer larder case is viewed as an outermost larder cases extending close to the opening of the larder enclosure.

In some embodiments, method 400 may proceed with activating an enclosure latch and/or closing a door of the larder enclosure during optional operation 408. In some embodiments, operation 408 involves both activating the enclosure latch and closing the door, which may be performed simultaneously or in two separate steps as, for example, described with reference to FIGS. 3E and 3F. Alternatively, operation 408 may involve either activating the enclosure latch or closing the door. For example, the enclosure latch may not be used and both inner and outer larder cases may be retained in the larder enclosure by the door when the door is closed. In other words, operation 408 may only involve closing the door. Alternatively, a larder enclosure may not have any doors. The outer larder case may be retained in the compartment by activating the enclosure latch. Various aspects of enclosure latches are described above with reference to FIGS. 3C-3F.

If operation 408 is performed, then method 400 may proceed with deactivating the enclosure latch and/or opening door of the larder enclosure during optional operation 410 (and prior to removing the outer larder case from the larder enclosure during operation 412). While operation 408 may involve automatic interlocking, operation 410 may involve a manual intervention form an operator.

Method 400 may proceed with removing the outer larder case from the enclosure during operation 412. This operation is performed while the outer larder case is still interlocked to the inner larder case. As such, the inner larder case is advanced to the opening of the larder enclosure during operation 412. Generally, the larder cases are removed from the larder enclosure one at a time. As such, the outer larder case needs to be unlatched from the inner larder case during operation 414 such that the outer larder case can be removed without further advancing the inner larder case, e.g., such as further removing the case through the opening.

In some embodiments, the inner case may be retained in the larder enclosure for some time after removal of the outer case. In this case, method 400 may proceed with activating an enclosure latch and/or closing a door of the larder enclosure during optional operation 416 such that the inner case is not accidently escapes through the opening. Furthermore, operation 416 may interlock the inner case to the larder enclosure since the enclosure is partially filled at this state. Method 400 may later proceed with deactivating the enclosure latch and/or opening door of the larder enclosure during optional operation 418. Operations 416 and 418 may be the same as operations 408 and 410, respectively. In some embodiments, operations 416 and 408 may differ. For example, during operation 408, the compartment may be full with the larder cases, while during operation 416, the compartment may be only partially filled. In this case, no interlocking between the larder cases and larder enclosure may be used during operation 408, while such interlocking may be performed during operation 416. Method 400 may proceed with removing the inner larder case during operation 422.

Examples of Aircraft Application

Examples of the disclosure may be described in the context of an aircraft manufacturing and service method 1100 as shown in FIG. 5 and aircraft 1102 as shown in FIG. 6. During pre-production, illustrative method 1100 may include specification and design 1104 of the aircraft 1102 and material procurement 1106. During production, component and subassembly manufacturing 1108 and system integration 1110 of aircraft 1102 take place. Thereafter, aircraft 1102 may go through certification and delivery 1112 to be placed in service 1114. While in service by a customer, aircraft 1102 is scheduled for routine maintenance and service 1116 (which may also include modification, reconfiguration, refurbishment, and so on). One or more larder systems may be installed into a fuselage of aircraft 1102 during any one of operations 1108-1114.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 6, aircraft 1102 produced by illustrative method 1100 may include airframe 1118 with a plurality of high-level systems 1218 and interior 1122. Interior 1122 is defined by the space within a fuselage. Interior 1122 may include one or more galleys each including one or more larder systems. Various examples of larder systems are described above. Examples of high-level systems 1218 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus and methods shown or described herein may be employed during any one or more of the stages of the aircraft manufacturing and service method 1100. For example, components or subassemblies corresponding to component and subassembly manufacturing 1108 may be fabricated or manufactured in a manner similar to components or subassemblies produced while aircraft 1102 is in service. Also, one or more aspects of the apparatus, method, or combination thereof may be utilized during operations 1108 and 1110, for example, by substantially expediting assembly of or reducing the cost of aircraft 1102. Similarly, one or more aspects of the apparatus or method realizations, or a combination thereof, may be utilized, for example and without limitation, while aircraft 1102 is in service, e.g., maintenance and service 1116.

Conclusion

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

What is claimed is:

1. A larder system for an aircraft, the larder system comprising:
   a larder enclosure comprising a first bottom support, a back wall, and a front wall;
   a first larder case disposed within the larder enclosure and slidably supported on the first bottom support of the larder enclosure,
      wherein the first larder case has a first side and a second side,
      wherein the first side of the first larder case faces the back wall of the larder enclosure,
      wherein the first larder case comprises a first latch positioned at the first side of the first larder case and a second latch positioned at the second side of the first larder case; and
   a second larder case disposed within the larder enclosure and slidably supported on the first bottom support of the larder enclosure between the first larder case and the back wall,
      wherein the second larder case has a first side and a second side,
      wherein the first side of the second larder case faces the back wall of the larder enclosure,
      wherein the second side of the second larder case faces the first side of the first larder case,
      wherein the second larder case comprises a first latch positioned at the first side and a second latch positioned at the second side, and
      wherein the first latch of the first larder case is detachably interlocked with the second latch of the second larder case such that sliding the first larder case on the first bottom support in a direction away from the back wall causes sliding of the second larder case on the first bottom support in the direction away from the back wall.

2. The larder system of claim 1, wherein at least one of the first latch of the first larder case or the second latch of the second larder case is movable between an interlocked position and an unlocked position,
   wherein, while in the interlocked position, the first latch of the first larder case is detachably interlocked with the second latch of the second larder case, and
   wherein, while in the unlocked position, the first latch of the first larder case is not interlocked with the second latch such that sliding the first larder case on the first bottom support in a direction away from the back wall does not cause sliding of the second larder case on the first bottom support in the direction away from the back wall.

3. The larder system of claim 2, wherein the second latch of the second larder case is movable, while the first latch of the first larder case is stationary.

4. The larder system of claim 3, wherein the second latch of the second larder case is substantially same as the second latch of the first larder case.

5. The larder system of claim 2, wherein the at least one of the first latch of the first larder case or the second latch of the second larder case is pivotable between the interlocked position and the unlocked position.

6. The larder system of claim 1, wherein at least one of the first latch of the first larder case or the second latch of the second larder case comprises a spring for maintaining the first latch of the first larder case detachably interlocked with the second latch of the second larder case.

7. The larder system of claim 1, wherein the larder enclosure comprises an enclosure latch detachably interlocked with the second latch of the first larder case thereby preventing the first larder case from sliding on the first bottom support.

8. The larder system of claim 7, wherein the enclosure latch prevents the first larder case to slide on the first bottom support toward the back wall of the larder enclosure.

9. The larder system of claim 7, wherein the enclosure latch is disposed at the front wall of the larder enclosure.

10. The larder system of claim 1, wherein the first larder case comprises a bumper pad disposed on the first side of the first larder case and contacting the second side of the second larder case when the first latch of the first larder case is detachably interlocked with the second latch of the second larder case.

11. The larder system of claim 10, wherein the bumper pad of the first larder case is compressible.

12. The larder system of claim 10, wherein the second larder case comprises a bumper pad disposed on the first side of the second larder case and contacting the back wall of the larder enclosure.

13. The larder system of claim 1, wherein the first latch of the first larder case is formed by a top edge of the first side of the first larder case.

14. The larder system of claim 1, wherein the larder enclosure comprises a door pivotably attached to the front wall of the larder enclosure, wherein the second latch of the first larder case contacts the door when the first larder case is positioned within the larder enclosure and when the door is closed such that the door prevents the first larder case from sliding on the first bottom support in the direction away from the back wall of the larder enclosure.

15. The larder system of claim 14, wherein the door comprises an enclosure latch detachably interlocked with the second latch of the first larder case when the door is closed such that the enclosure latch prevents the first larder case from sliding on the first bottom support in the direction away toward the back wall of the larder enclosure.

16. The larder system of claim 1, wherein the first larder case comprises a first pad for sliding on the first bottom support, and wherein the second larder case comprises a second pad for sliding on the first bottom support.

17. The larder system of claim 1, wherein the first bottom support comprises a linear bearing for sliding the first larder case and the second larder case on the first bottom support.

18. The larder system of claim 1, further comprising a third larder case disposed within the larder enclosure and slidably supported on a second bottom support of the larder enclosure, wherein the first bottom support is disposed between the first larder case and the third larder case.

19. An aircraft comprising:
a fuselage; and
a larder system disposed within the fuselage,
the larder system comprising:
  a larder enclosure comprising a first bottom support, a back wall, and a front wall;
  a first larder case disposed within the larder enclosure and slidably supported on the first bottom support of the larder enclosure,
    wherein the first larder case has a first side and a second side,
    wherein the first side of the first larder case faces the back wall of the larder enclosure,
    wherein the first larder case comprises a first latch positioned at the first side of the first larder case and a second latch positioned at the second side of the first larder case; and
  a second larder case disposed within the larder enclosure and slidably supported on the first bottom support of the larder enclosure between the first larder case and the back wall,
    wherein the second larder case has a first side and a second side,
    wherein the first side of the second larder case faces the back wall of the larder enclosure,
    wherein the second side of the second larder case faces the first side of the first larder case,
    wherein the second larder case comprises a first latch positioned at the first side and a second latch positioned at the second side, and
    wherein the first latch of the first larder case is detachably interlocked with the second latch of the second larder case such that sliding the first larder case on the first bottom support in a direction away from the back wall causes sliding of the second larder case on the first bottom support in the direction away from the back wall.

20. A method for operating a larder system, the method comprising
  inserting an inner larder case into a larder enclosure,
    wherein the inner larder case comprises a first side and a second side,
    wherein the first side of the inner larder case faces a back wall of the larder enclosure, and
    wherein the inner larder case comprises a first latch positioned at the first side of the inner larder case and a second latch positioned at the second side of the inner larder case;
  inserting an outer larder case into the larder enclosure,
    wherein the inner larder case is disposed between the outer larder case and the back wall of the larder enclosure,
    wherein the outer larder case has a first side and a second side,
    wherein the first side of the outer larder case faces the back wall of the larder enclosure,
    wherein the second side of the inner larder case faces the first side of the outer larder case,
    wherein the outer larder case comprises a first latch positioned at the first side and a second latch positioned at the second side, and
    wherein the first latch of the outer larder case is detachably interlocked with the second latch of the inner larder case as the outer larder case is inserted into the larder enclosure,
    wherein, when the first latch of the outer larder case is interlocked with the second latch of the inner larder case, sliding the outer larder case on the first bottom support in a direction away from the back wall causes sliding of the inner larder case on the first bottom support in the direction away from the back wall.

* * * * *